US011327149B2

(12) United States Patent
Choi et al.

(10) Patent No.: US 11,327,149 B2
(45) Date of Patent: May 10, 2022

(54) LASER SPECKLE SYSTEM AND METHOD FOR AN AIRCRAFT

(71) Applicant: Aurora Flight Sciences Corporation, Manassas, VA (US)

(72) Inventors: Jae-Woo Choi, Manassas, VA (US); James Paduano, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 0 days.

(21) Appl. No.: 16/736,339

(22) Filed: Jan. 7, 2020

(65) Prior Publication Data

US 2020/0150217 A1   May 14, 2020

Related U.S. Application Data

(63) Continuation of application No. 15/645,148, filed on Jul. 10, 2017, now Pat. No. 10,527,711.

(51) Int. Cl.
*G01S 5/16*  (2006.01)
*G02B 27/48*  (2006.01)
(Continued)

(52) U.S. Cl.
CPC .............. *G01S 5/16* (2013.01); *B64C 39/024* (2013.01); *B64D 47/08* (2013.01); *G01S 1/7032* (2019.08);
(Continued)

(58) Field of Classification Search
CPC ............................................. G02B 2027/0163
See application file for complete search history.

(56) References Cited

U.S. PATENT DOCUMENTS 6,377,353 B1   4/2002   Ellis
7,433,024 B2   10/2008  Garcia et al.
(Continued)

FOREIGN PATENT DOCUMENTS

CN    104062977 A    9/2014
CN    105046746 A    11/2015
(Continued)

OTHER PUBLICATIONS

Dougherty, J.A., 2014. Laser-Guided Autonomous Landing of a Quadrotor UAV on an Inclined Surface (Doctoral dissertation, The George Washington University). (Year: 2014).*
(Continued)

*Primary Examiner* — Clifford Hilaire
(74) *Attorney, Agent, or Firm* — Michael Stanley Tomsa; McAndrews, Held & Malloy, Ltd.; Eugene H. Nahm

(57) ABSTRACT

A system for registering multiple point clouds captured by an aircraft is disclosed. The system includes a speckle generator, at least one three-dimensional (3D) scanner, and a processor coupled thereto. In operation, the speckle generator projects a laser speckle pattern onto a surface (e.g., a featureless surface). The at least one 3D scanner scans the featureless surface to generate a plurality of point clouds of the featureless surface and to image at least a portion of the laser speckle pattern. The processor, which is communicatively coupled with the at least one 3D scanner, registers the plurality of point clouds to generate a complete 3D model of the featureless surface based at least in part on the laser speckle pattern.

20 Claims, 12 Drawing Sheets

(51) Int. Cl.

| | | |
|---|---|---|
| *G06T 7/73* | (2017.01) | |
| *B64D 47/08* | (2006.01) | |
| *G05D 1/06* | (2006.01) | |
| *B64C 39/02* | (2006.01) | |
| *H04N 13/271* | (2018.01) | |
| *G06T 7/33* | (2017.01) | |
| *G01S 1/70* | (2006.01) | |
| *G06K 9/00* | (2006.01) | |
| *G05D 1/10* | (2006.01) | |
| *G01S 17/89* | (2020.01) | |

(52) U.S. Cl.
CPC ............ *G01S 1/7038* (2019.08); *G02B 27/48* (2013.01); *G05D 1/0676* (2013.01); *G05D 1/101* (2013.01); *G06K 9/0063* (2013.01); *G06K 9/00214* (2013.01); *G06K 9/00664* (2013.01); *G06T 7/337* (2017.01); *G06T 7/74* (2017.01); *H04N 13/271* (2018.05); *B64C 2201/024* (2013.01); *B64C 2201/042* (2013.01); *B64C 2201/127* (2013.01); *B64C 2201/146* (2013.01); *G01S 17/89* (2013.01); *G06T 2200/04* (2013.01); *G06T 2200/08* (2013.01); *G06T 2207/10028* (2013.01); *G06T 2207/10032* (2013.01); *G06T 2207/30204* (2013.01); *G06T 2207/30208* (2013.01); *G06T 2207/30244* (2013.01)

(56) References Cited

U.S. PATENT DOCUMENTS

| | | |
|---|---|---|
| 7,543,780 B1 | 6/2009 | Marshall et al. |
| 8,290,305 B2 | 10/2012 | Minear et al. |
| 8,581,981 B2 | 11/2013 | Alley et al. |
| 8,605,964 B2 | 12/2013 | Fichtinger et al. |
| 8,611,692 B2 | 12/2013 | Nimnual et al. |
| 8,874,283 B1 | 10/2014 | Cavote |
| 8,903,568 B1 | 12/2014 | Wang et al. |
| 8,933,820 B1 | 1/2015 | Tyson et al. |
| 8,938,160 B2 | 1/2015 | Wang |
| 9,091,536 B2 | 7/2015 | Hausler |
| 9,277,130 B2 | 3/2016 | Wang et al. |
| 2006/0083111 A1 | 4/2006 | Grasso |
| 2008/0101688 A1 | 5/2008 | Quadling et al. |
| 2008/0106746 A1 | 5/2008 | Shpunt et al. |
| 2008/0123098 A1* | 5/2008 | Pless ................. G06K 9/00577 356/450 |
| 2008/0240502 A1 | 10/2008 | Freedman et al. |
| 2008/0284790 A1* | 11/2008 | Protola ................. G01B 11/26 345/582 |
| 2009/0096783 A1 | 4/2009 | Shpunt et al. |
| 2009/0185274 A1 | 7/2009 | Shpunt |
| 2010/0020078 A1 | 1/2010 | Shpunt |
| 2010/0034457 A1 | 2/2010 | Berliner et al. |
| 2015/0120057 A1 | 4/2015 | Wong et al. |
| 2016/0314592 A1 | 10/2016 | Chen et al. |
| 2017/0067734 A1 | 3/2017 | Heidemann et al. |
| 2017/0138732 A1* | 5/2017 | Pettersson ............ G05D 1/0022 |
| 2017/0277187 A1* | 9/2017 | Refai ........................ G06T 7/30 |
| 2019/0130630 A1 | 5/2019 | Ackerson et al. |

FOREIGN PATENT DOCUMENTS

| | | |
|---|---|---|
| JP | 2001-066123 A | 3/2001 |
| JP | 2008-145431 A | 6/2008 |
| JP | 2015-184056 A | 10/2015 |
| WO | 2007043036 A1 | 4/2007 |
| WO | 2014014341 A | 1/2014 |
| WO | 2016059930 A | 4/2016 |

OTHER PUBLICATIONS

Geng J. Structured-light 3D surface imaging: a tutorial. Advances in Optics and Photonics. Jun. 30, 2011;3(2):128-60. (Year: 2011).*
Ennos, A. E., Laser speckle experiments for students, Physics Education, vol. 31, No. 3, pp. 138-142 (Feb. 1996).
Yaofeng S, Rang J H. Study of optimal subset size in digital image correlation of speckle pattern images. Optics and lasers in engineering. Sep. 1, 2007; 45(9):967-74. (Year: 2007).
Van Zandt NR. Modeled and Measured Partially Coherent Illumination Speckle Effects from Sloped Surfaces for Tactical Tracking, Air Force Institute of Technology Wright-Patterson AFB OH Graduate School of Engineering and Management; Mar. 26, 2015. (Year: 2015).
Scherer, Sebastian A. "Efficient Visual SLAM for Autonomous Aerial Vehicles," PhD diss., Eberhard Karls Universitat Tubingen, 2016. (Year: 2016).
Partial European Search Report for European Patent Application No. 18182517.5, dated Dec. 10, 2018.
Extended European search report for Application No. EP 18182517.5, dated Mar. 18, 2019.
Notification of Deficiencies dated Jul. 6, 2021 in Patent Application (and translation) in Israel application No. 259219 (8 pages).
Examination report for Application No. EP 18182517.5, dated Jun. 28, 2021 (8 pages).
Notice of Reasons for Rejection, dated Mar. 22, 2022, in Japanese Patent Application 2018-127205 (and translation) (10 pages).

* cited by examiner

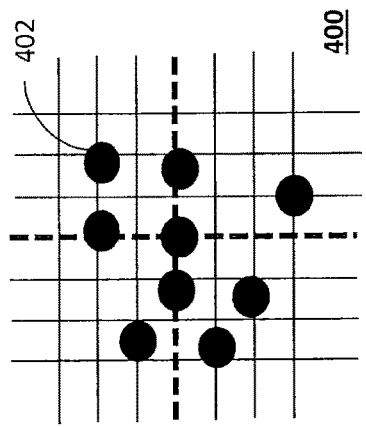
Figure 4b
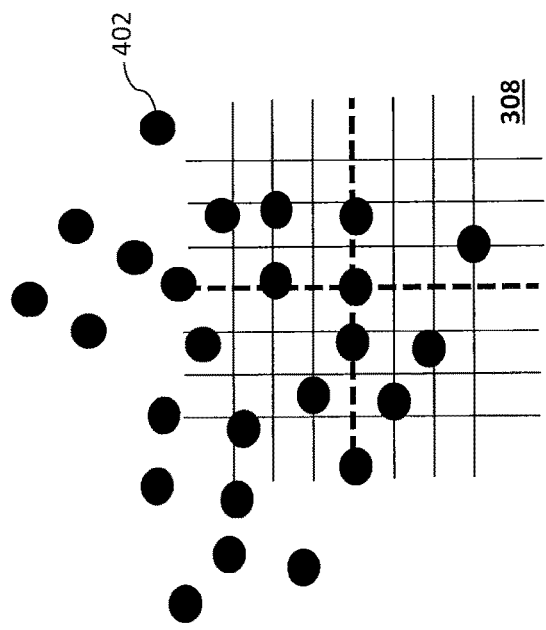
Figure 4a
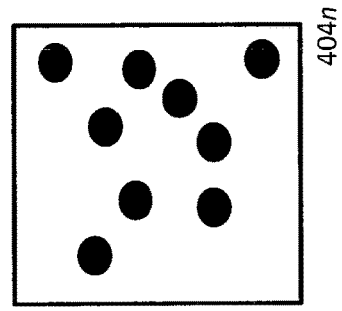
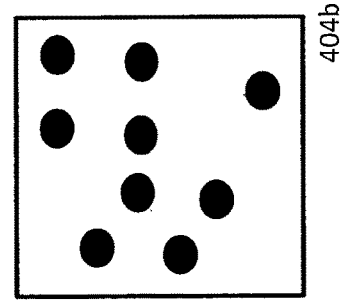
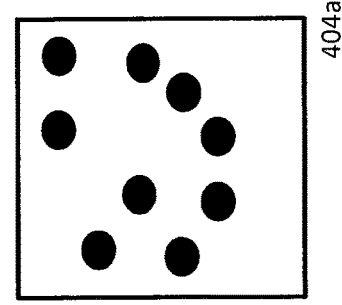
Figure 4c

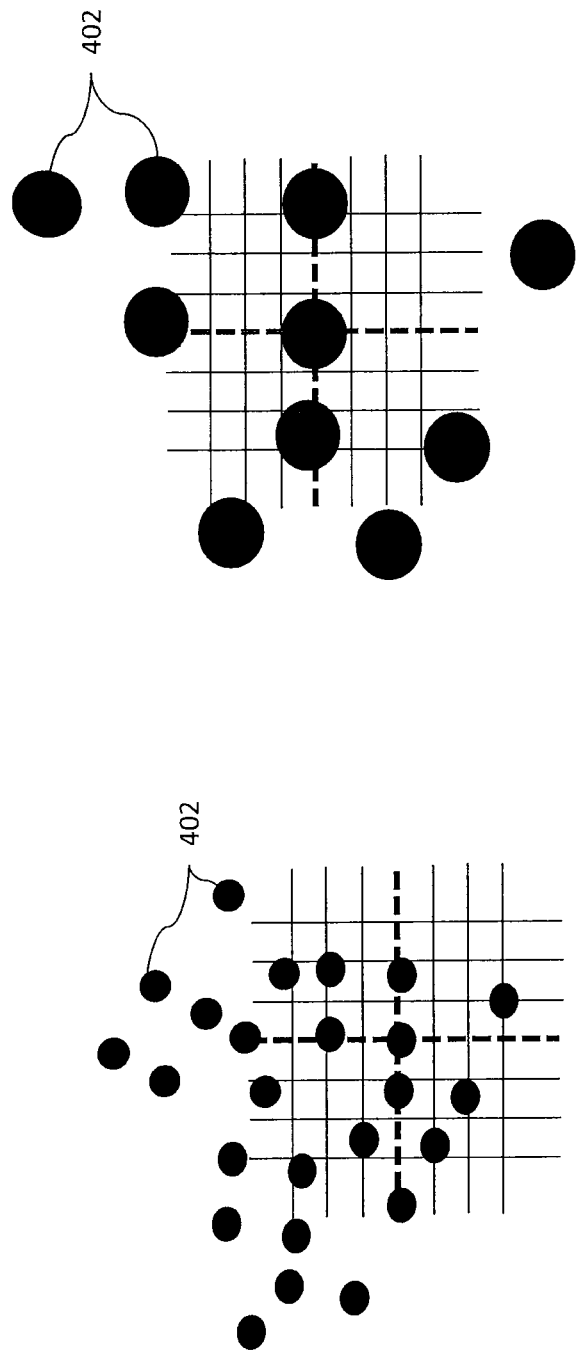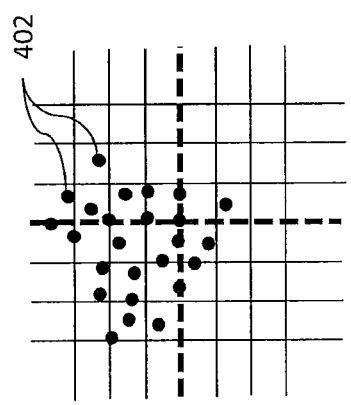

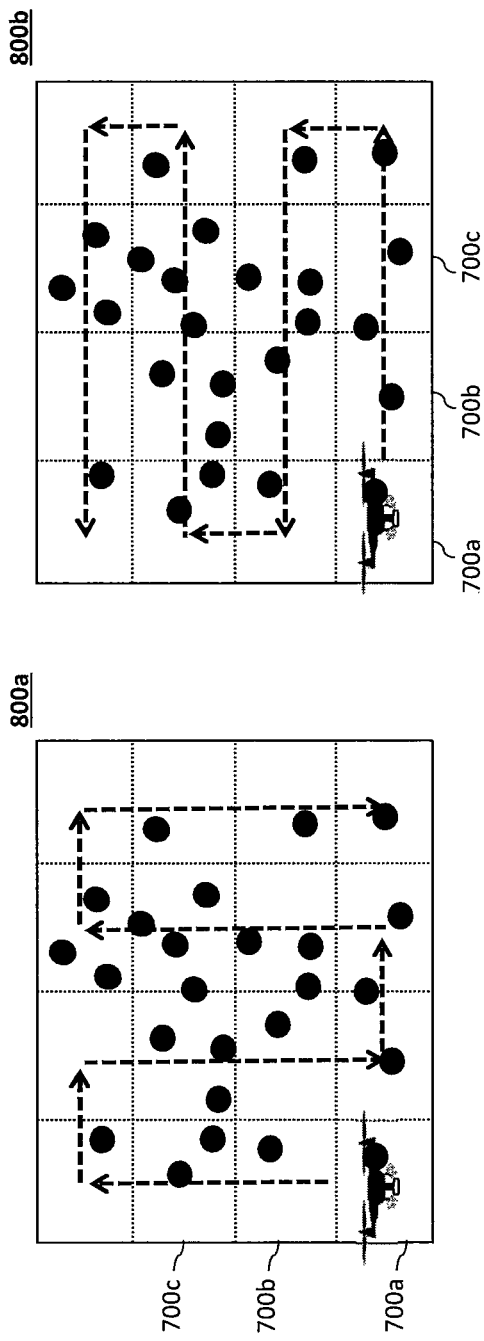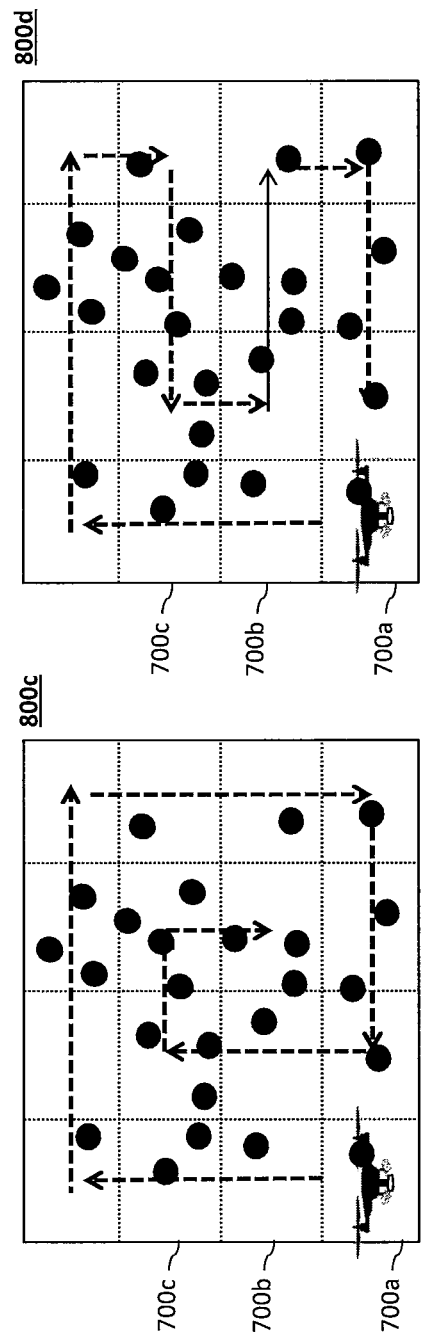

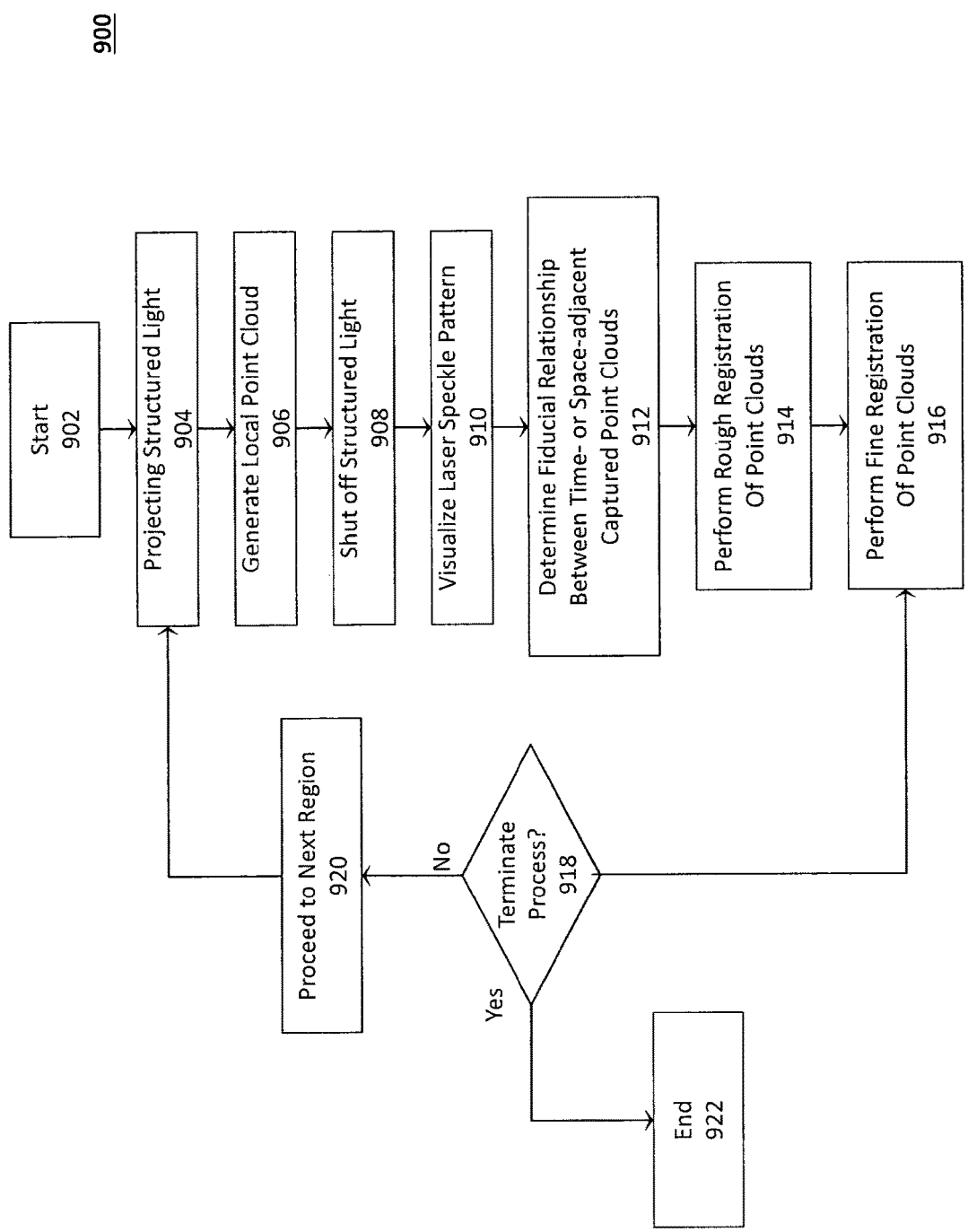

LASER SPECKLE SYSTEM AND METHOD FOR AN AIRCRAFT

CROSS-REFERENCE

The present application is a continuation of U.S. patent application Ser. No. 15/645,148, filed Jul. 10, 2017, and titled "Laser Speckle System and Method for an Aircraft," the contents of which are hereby incorporated by reference.

FIELD

This present disclosure generally relates to systems and methods for registering point clouds and localizing an aerial vehicle and, more specifically, to registering point clouds and localizing an aerial vehicle using laser speckle techniques.

BACKGROUND

Unmanned aerial vehicle ("UAV") technology has proven to be a valuable tool for mission profiles involving intelligence, surveillance, reconnaissance, and payload delivery. In contexts such as low-altitude urban reconnaissance, a UAV, such as a micro-air vehicle ("MAV") or unmanned aerial system ("UAS"), may encounter both large and small obstacles. To mitigate collision, the UAV may be localized to a particular location. More recently, UAVs have been employed to monitor the integrity of structure (e.g., buildings, bridges, etc.). As can be appreciated, scanning a structure requires both localization of the aircraft and techniques for registering, or stitches together, multiple point clouds generated by the UAV's scanner/cameras during a scanning process. Existing methods of localizing, or otherwise restricting, a UAS with respect to a single point on the ground rely on uncertain visual data sources, such as photogrammetry or visual odometry. The uncertainty introduced in using visual methods propagates with respect to the distance from the source and the errors are measured in pixels. Accordingly, a need exists for a system and method for localizing an aerial vehicle.

SUMMARY

A system and method are disclosed for registering point clouds and localizing an aerial vehicle using laser speckle techniques.

According to a first aspect, a system for registering multiple point clouds comprises: a speckle generator to project a first laser speckle pattern onto a surface; at least one three-dimensional (3D) scanner to scan the surface, wherein the at least one 3D scanner is configured to generate a plurality of point clouds of the surface and to image at least a portion of the first laser speckle pattern; and a processor communicatively coupled with the at least one 3D scanner to register the plurality of point clouds to generate a 3D model of the surface based at least in part on the first laser speckle pattern.

In certain aspects, the speckle generator includes a laser source to generate a laser beam and an optical element to diffract the laser beam into a plurality of laser beams of multiple orders, wherein the plurality of laser beams defines the first laser speckle pattern.

In certain aspects, the first laser speckle pattern is a pseudo-random laser speckle pattern.

In certain aspects, the optical element comprises a diffraction grating having a plurality of parallel, closely spaced slits.

In certain aspects, the optical element comprises a multifocal diffractive lens having a plurality of grooved diffraction patterns.

In certain aspects, the at least one three-dimensional (3D) scanner is coupled to an aircraft.

In certain aspects, the aircraft further comprises a diffuser and a downward-facing camera communicatively coupled with the processor, the downward-facing camera being configured to image a first surface of the diffuser.

In certain aspects, the speckle generator is configured to project a second laser speckle pattern onto a second surface of the diffuser.

In certain aspects, the first surface and the second surface reside in parallel planes, the diffuser being fabricated using an opaque material.

In certain aspects, the downward-facing camera is configured to image the first surface to capture the second laser speckle pattern.

In certain aspects, the processor is configured to determine a lateral position of the aircraft based at least in part on the second laser speckle pattern's position in a known coordinate system.

In certain aspects, the second laser speckle pattern comprises a plurality of dots and the processor is configured to: (1) determine a dot size of the second laser speckle pattern by measuring a diameter of at least one of said plurality of dots; or (2) determine a dot distance by measuring a distance between at least two of said plurality of dots.

In certain aspects, the processor is configured to determine a vertical position of the aircraft based at least in part on the dot size or the dot distance.

In certain aspects, the processor is configured to identify a speckle pattern by selecting from the first laser speckle pattern a plurality of random nearest neighbor dots.

In certain aspects, the plurality of random nearest neighbor dots comprises 6 to 14 random nearest neighbor dots.

In certain aspects, the processor is configured to compare the speckle pattern to a plurality of known speckle patterns to identify, from the plurality of known speckle patterns, a best match speckle pattern.

In certain aspects, a physical location of the speckle generator is known, and the processor is configured to localize the aircraft relative to the speckle generator based at least in part on the best match speckle pattern.

In certain aspects, the processor is positioned on the aircraft.

In certain aspects, the processor is positioned remotely from the aircraft and communicatively coupled with the aircraft via one or more wireless transceivers.

In certain aspects, the processor is configured to perform a rough registration of the plurality of point clouds based at least in part on the first laser speckle pattern.

In certain aspects, the processor is configured to perform a fine registration of the plurality of point clouds using one or more algorithm to minimize the difference between two clouds points.

In certain aspects, the one or more algorithm includes the Iterative Closest Point (ICP) algorithm.

In certain aspects, the system further comprises a memory device in communication with the processor to store the plurality of known speckle patterns.

According to a second aspect, an aircraft for imaging a surface of a structure comprises, where the surface has a first laser speckle pattern projected thereon from a speckle generator: an airframe; a plurality of motors operatively coupled with a propeller; at least one three-dimensional (3D) scanner to scan the surface, wherein the at least one 3D scanner is configured to generate a plurality of point clouds toward the surface and to image at least a portion of the first laser speckle pattern; and a processor communicatively coupled with the at least one 3D scanner to register the plurality of point clouds to generate a complete 3D model of the surface based at least in part on the first laser speckle pattern.

In certain aspects, the first laser speckle pattern is a pseudo-random laser speckle pattern.

In certain aspects, the aircraft further comprises a diffuser and a downward-facing camera communicatively coupled with the processor, the downward-facing camera being configure to image a first surface of the diffuser.

In certain aspects, the downward-facing camera is configured to image the first surface to capture a second laser speckle pattern projected onto a second surface of the diffuser.

In certain aspects, the first surface and the second surface reside in parallel planes, the diffuser being fabricated using an opaque material.

In certain aspects, the processor is configured to determine a lateral position of the aircraft based at least in part on the second laser speckle pattern's position in a known coordinate system.

In certain aspects, the second laser speckle pattern comprises a plurality of dots and the processor is configured to: (1) determine a dot size of the second laser speckle pattern by measuring a diameter of at least one of said plurality of dots; or (2) determine a dot distance by measuring a distance between at least two of said plurality of dots.

In certain aspects, the processor is configured to determine a vertical position of the aircraft based at least in part on the dot size or the dot distance.

In certain aspects, the processor is configured to identify a speckle pattern by selecting from the first laser speckle pattern a plurality of random nearest neighbor dots.

In certain aspects, the plurality of random nearest neighbor dots comprises 6 to 14 random nearest neighbor dots.

In certain aspects, the processor is configured to compare the speckle pattern to a plurality of known speckle patterns to identify, from the plurality of known speckle patterns, a best match speckle pattern.

In certain aspects, a physical location of the speckle generator is known, and processor is able to localize the aircraft relative to the speckle generator based at least in part on the best match speckle pattern.

In certain aspects, the processor is configured to perform a rough registration of the plurality of point clouds based at least in part on the first laser speckle pattern.

In certain aspects, the processor is configured to perform a fine registration of the plurality of point clouds using one or more algorithm to minimize the difference between two clouds points.

In certain aspects, the one or more algorithm includes the Iterative Closest Point (ICP) algorithm.

In certain aspects, the aircraft comprises a plurality of rotor booms extending radially from the airframe, wherein each of said plurality of motors is positioned at a distal end of one of said plurality of rotor booms and is electrically coupled to an electronic speed controller (ESC).

According to a third aspect, a method of registering multiple point clouds captured by an aircraft when scanning a surface having a laser speckle pattern comprises: projecting a structured light from a 3D scanner to visualize a first region of the surface; generating, via a processor, a first local point cloud associated with the first region; turning off the structured light from the 3D scanner; visualizing, via the 3D scanner, a least a portion of the laser speckle pattern; projecting the structured light from the 3D scanner to visualize a second region of the surface; generating, via the processor, a second local point cloud associated with the second region; turning off the structured light from the 3D scanner; and performing a registration of the first local point cloud and the second local point cloud based at least in part on the laser speckle pattern.

In certain aspects, the method further comprises the step of performing a registration of the first local point cloud and the second local point cloud using one or more algorithms to minimize the difference between the first local point cloud and the second local point cloud.

In certain aspects, the one or more algorithm includes the Iterative Closest Point (ICP) algorithm.

In certain aspects, the method further comprises the steps of: projecting the structured light from the 3D scanner to visualize a third region of the surface; generating, via the processor, a third local point cloud associated with the third region; turning off the structured light from the 3D scanner; and performing a registration of the third local point cloud with the second local point cloud based at least in part on the laser speckle pattern.

According to a third aspect, a system for identifying a touchdown zone for an aircraft within a landing zone comprises: a speckle generator positioned at the landing zone to project a laser speckle pattern onto a surface, wherein the speckle generator includes a laser source to generate a laser beam and an optical element to diffract the laser beam into a plurality of laser beams of multiple orders, wherein the plurality of laser beams defines the laser speckle pattern; at least one optical capture device to be coupled with the aircraft, wherein the at least one optical capture device is configured to image at least a portion of the laser speckle pattern projected onto the surface; and a processor communicatively coupled with the at least one optical capture device to localize the aircraft relative to the touchdown zone within the landing zone based at least in part on the at least a portion of the laser speckle pattern.

In certain aspects, the laser speckle pattern is a pseudo-random laser speckle pattern.

In certain aspects, the aircraft comprises an opaque diffuser having a first surface residing in a first plane and a second surface residing in a second plane that is substantially parallel to the first plane, wherein the second surface of the opaque diffuser is the surface having the laser speckle pattern projected thereon.

In certain aspects, the at least one optical capture device is a downward-facing camera configured to image the first surface of the opaque diffuser to capture the laser speckle pattern projected on the second surface.

In certain aspects, the speckle generator is elevated and configured to project the laser speckle pattern downward toward the surface.

In certain aspects, the surface is a ground surface or the touchdown zone.

In certain aspects, the optical element comprises a diffraction grating or a multifocal diffractive lens.

In certain aspects, the at least one optical capture device is a downward-facing camera.

In certain aspects, the processor is configured to generate instructions to land the aircraft at the touchdown zone based at least in part on the at least a portion of the laser speckle pattern.

In certain aspects, the processor is configured to determine a lateral position of the aircraft based at least in part on the laser speckle pattern's position in a known coordinate system.

In certain aspects, the laser speckle pattern comprises a plurality of dots and the processor is configured to: (1) determine a dot size of the second laser speckle pattern by measuring a diameter of at least one of said plurality of dots; or (2) determine a dot distance by measuring a distance between at least two of said plurality of dots.

In certain aspects, the processor is configured to determine a vertical position of the aircraft based at least in part on the dot size or the dot distance.

In certain aspects, the at least one optical capture device includes a camera and a three-dimensional (3D) scanner.

DRAWINGS

The foregoing and other objects, features, and advantages of the devices, systems, and methods described herein will be apparent from the following description of particular embodiments thereof, as illustrated in the accompanying figures, where like reference numbers refer to like structures. The figures are not necessarily to scale, emphasis instead is being placed upon illustrating the principles of the devices, systems, and methods described herein.

FIGS. 4a to 4c illustrate an example laser speckle processing technique.

FIGS. 6a to 6c illustrate a pseudo-random laser speckle pattern at different distances.

FIGS. 8a to 8d illustrate a diagram of example scanning flight patterns for an aircraft when scanning different regions of a surface.

FIG. 9 illustrates a flow chart of an example scanning process for an aircraft.

DESCRIPTION

Figure 1A:
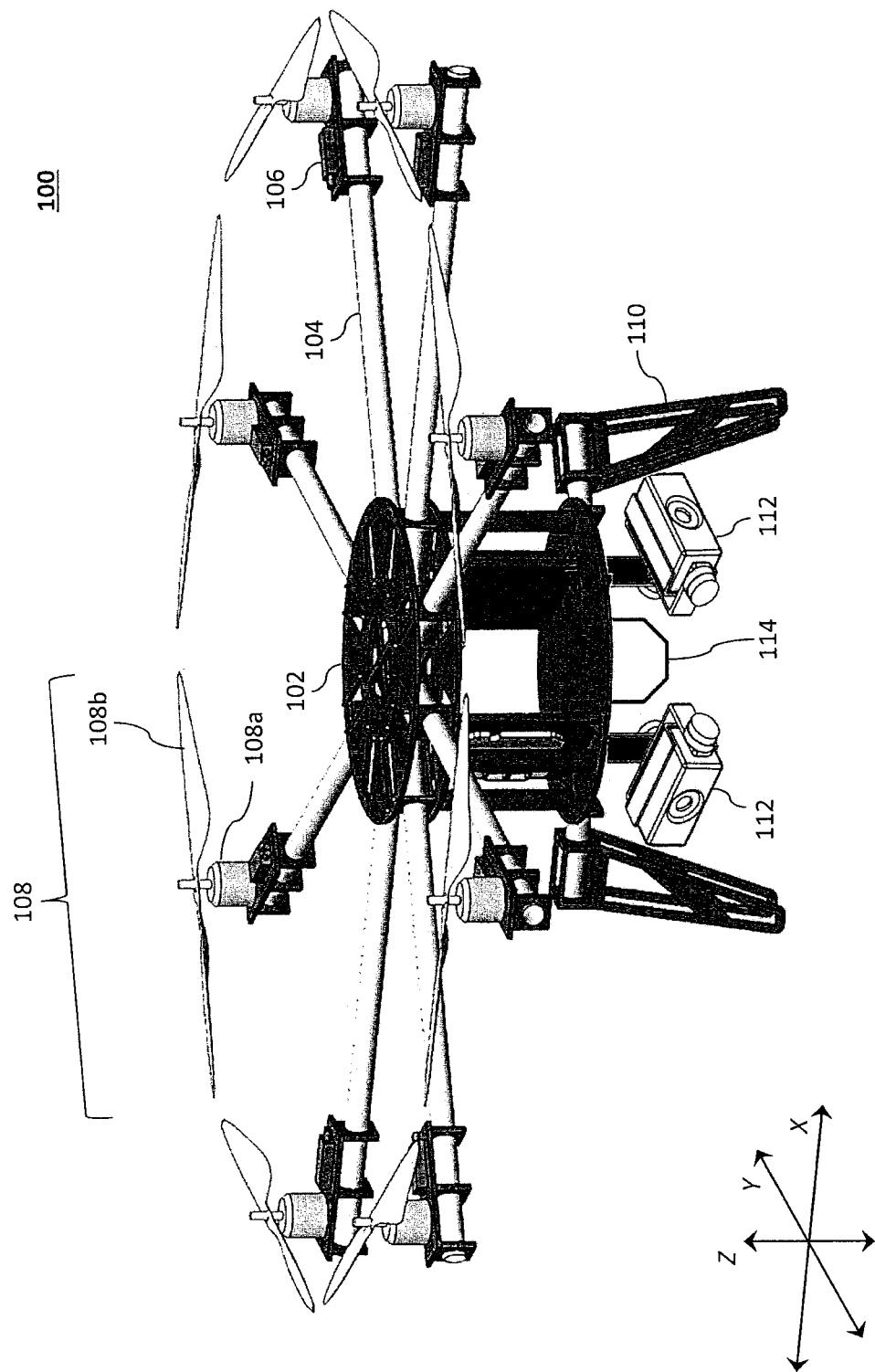
FIG. 1 illustrates an example multi-rotor vertical take-off and landing (VTOL) UAV.

Preferred embodiments of the present disclosure will be described hereinbelow with reference to the accompanying drawings. The components in the drawings are not necessarily drawn to scale, the emphasis instead being placed upon clearly illustrating the principles of the present embodiments. For instance, the size of an element may be exaggerated for clarity and convenience of description. Moreover, wherever possible, the same reference numbers are used throughout the drawings to refer to the same or like elements of an embodiment. In the following description, well-known functions or constructions are not described in detail because they may obscure the disclosure in unnecessary detail. No language in the specification should be construed as indicating any unclaimed element as essential to the practice of the embodiments.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like, are words of convenience and are not to be construed as limiting terms. The various data values (e.g., voltages, seconds, etc.) provided herein may be substituted with one or more other predetermined data values and, therefore, should not be viewed limiting, but rather, exemplary. For this disclosure, the following terms and definitions shall apply:

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

The terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The term "memory device" means computer hardware or circuitry to store information for use by a processor. The memory device can be any suitable type of computer memory or any other type of electronic storage medium, such as, for example, read-only memory (ROM), random access memory (RANI), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "network" as used herein includes both networks and inter-networks of all kinds, including the Internet, and is not limited to any particular network or inter-network.

The term "processor" means processing devices, apparatuses, programs, circuits, components, systems, and subsystems, whether implemented in hardware, tangibly embodied software, or both, and whether or not it is programmable. The term "processor" includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with, a memory device.

The terms "aerial vehicle" and "aircraft" refer to a machine capable of flight, including, but not limited to, fixed wing aircraft, unmanned aerial vehicle, variable wing aircraft, and vertical take-off and landing (VTOL) aircraft.

Disclosed herein is a laser speckle system having a laser source to generate laser speckle, which may be used by an aircraft as fiducial markers to: register two or more point clouds as one or more three-dimensional (3D) scanners scan a surface (e.g., to detect defects in the surface); and to localize the aircraft to which the 3D scanner is mounted. Localizing the aircraft from a single ground source (e.g., a speckle generator), as well as registering point clouds of a wall measured from the aircraft, requires a good ground truth (i.e., empirical evidence). Therefore, as will be explained, a portion of the laser speckle can imaged by one or more optical capture devices (e.g., 3D scanners, cameras, etc.) mounted to the aircraft. Based at least in part on the laser speckle's pattern, dot size, and/or dot distance of the of the laser speckle, the laser speckle system enables the aircraft (or another system communicatively coupled thereto) to register multiple point clouds generated by the 3D scanner and to determine the location of the aircraft with respect to the calibrated laser source.

Accordingly, the laser speckle enables the aircraft to scan a surface that lacks fiducial markers (e.g., a featureless surface). More particularly, from a known, stable central location, a calibrated laser source may be configured to generate and project a laser speckle toward a featureless surface (or another surface to be scanned by the aircraft) to display a pseudo-random laser speckle pattern (e.g., an array or constellation of dots) on the featureless surface. The pseudo random laser speckle pattern enables the aircraft's 3D scanner(s) to register two or more point clouds during the scanning process. A pseudo-random laser speckle pattern may also be displayed on a diffuser coupled to an aircraft, which may be used to localize the aircraft (e.g., laterally and vertically in a 3D air space). The disclosed laser speckle system may be employed in connection with various aircraft configurations, including, inter alia, multi-rotor UAVs.

Multi-Rotor VTOL UAV. A suitable aircraft 100 for use with the laser speckle system can be configured as a multi-rotor VTOL UAV, an example of which is illustrated in FIG. 1*a*. As illustrated, the aircraft 100 generally comprises an airframe 102 (e.g., a fuselage), a plurality of rotor booms 104 (e.g., longitudinal booms) extending radially from the airframe 102, landing gear 110, and a plurality of propulsors 108. While a multi-rotor VTOL UAV is illustrated throughout the figures, the teachings of the present disclosure may similarly be applied to other aircraft, including fixed wing aircraft, and non-aircraft systems that may be configured to scan a featureless surface (e.g., land vehicles).

The airframe 102 may be coupled with a proximal end of each of the plurality of rotor booms 104 such that the distal ends of the plurality of rotor booms 104 extend radially from the airframe 102. The airframe 102 and the plurality of rotor booms 104 may be fabricated as a singular unit, or as separate components to be coupled to one another. The distal end of each of the plurality of rotor booms 104 may be coupled with a propulsor 108, each of which is illustrated as a propeller 108*b* coupled with an electric motor 108*a* to drive/rotate the propeller 108*b*. Each of said plurality of propulsors 108 is placed at a distal end of a rotor boom 104 and oriented to direct thrust downward (relative to the airframe 102). The electric motor 108*a* may be an electric motor controlled via an electronic speed controller (ESC) 106. To that end, an ESC 106 may also be provided, for example, adjacent the electric motor 108*a* at the distal end of a rotor boom 104. While the aircraft 100 is illustrated as having eight propulsors 108 (i.e., an octo-rotor aircraft), a person of skill in the art would understand that additional, or fewer, propulsors 108 may be employed to achieve a desired function and depending on, for example, thrust requirements.

While the electric motors 108a are illustrated at the distal end of each rotor booms 104, the electric motors 108a (or a single electric motor 108a) may instead be positioned at the airframe 102 and configured to drive (rotate) one or more propellers 108b via a gearbox and/or a driveshaft between the electric motor 108a and the one or more propellers 108b. Further, while each rotor booms 104 is illustrated as having only a single propulsor 108, multiple propulsors 108 may be provided at the distal end of each rotor booms 104. For example, a cross-member may be positioned at the distal end of each rotor booms 104 and arranged to space the propulsors 108 from one another (e.g., perpendicularly to the length of the rotor boom 104) or to otherwise prevent interference between propellers 108b (e.g., a staggered/overlapping configuration). The components of the aircraft 100 may be fabricated from metal, a composite material, or a combination thereof.

As illustrated, the aircraft 100 is equipped with one or more 3D scanners 112 and one or more cameras 114, each of which may be rotatably and pivotally coupled to the airframe 102 (e.g., at the underside) via one or more gimbal devices. The 3D scanner 112 may be, for example, a RGB-D camera having two components, i.e., RGB (red/green/blue) and D (depth) components. The one or more 3D scanners 112 may be positioned along the perimeter of the airframe 102 to provide the aircraft 100 with a field of view to scan and generate a 3D image of a surface that is non-parallel to the ground (e.g., a surface that is substantially perpendicular to the ground). For example, the aircraft 100 may be configured to scan and/or map the surface of a wall or other structure to identify defects using the 3D scanner 112. The one or more cameras 114 may be, for example, a camera equipped with wide-angle lens to cover a relatively large field-of-view (FOV), such as a wide field-of-view or fisheye lens camera. The one or more cameras 114, unlike the 3D scanners 112, may be positioned to or directed towards a surface of interest to be scanned. In some embodiments, the one or more cameras 114 may be directed downward (relative to the aircraft 100) to image a surface that is substantially parallel to the ground, such as a surface of a diffuser 208 mounted to the aircraft 100. In operation, the aircraft 100 may be configured to detect any offset of the aircraft 100 using the one or more cameras 114 and a laser speckle projected onto the diffuser 208.

Figure 1B:
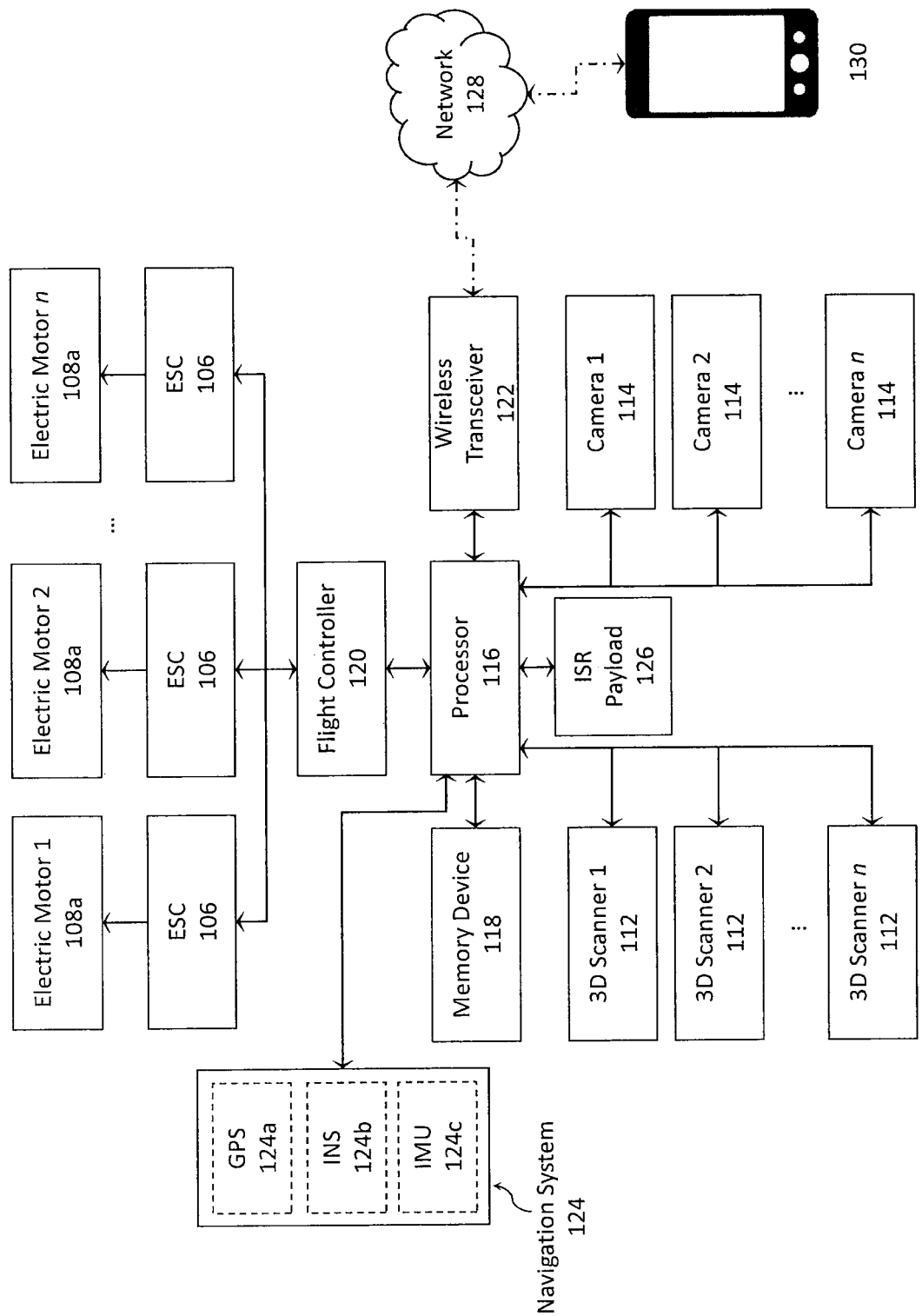

FIG. 1b illustrates a block diagram of an example aircraft control system for the aircraft 100. The aircraft control system is configured to control the various aircraft components and functions of the aircraft 100. As illustrated, the aircraft 100 includes one or more processors 116 communicatively coupled with at least one memory device 118, one or more 3D scanners 112, one or more cameras 114, a flight controller 120, a wireless transceiver 122, and a navigation system 124.

The one or more processors 116 may be configured to perform one or more operations based at least in part on instructions (e.g., software) and one or more databases stored to the memory device 118 (e.g., hard drive, flash memory, or the like). The aircraft control system may further include other desired services, such as a wireless transceiver 122 to communicate data between the aircraft 100 and a remote device 130 (e.g., portable electronic devices, such as smartphones, tablets, and laptop computers) or other controller (e.g., a base station). For example, the aircraft 100 may communicate data (processed data, unprocessed data, etc.) with the remote device 130 over a network 128.

The processor 116 may be operatively coupled to the flight controller 120 to control operation of the various actuators (e.g., those to control movement of any flight surfaces) and/or electric motor 108a (e.g., via ESC 106) in response to commands from an operator, autopilot, a navigation system 124, or other high-level system via the wireless transceiver 122. In operation, the flight controller 120 may dynamically (i.e., in real-time or near real-time) and independently adjust thrust from each of the electric motors 108a on each rotor boom 104 during the various stages of flight (e.g., take-off, cruising, landing) via the ESC 106 to control roll, pitch, or yaw of the aircraft 100. In other words, the flight controller 120 can independently control each of the electric motors 108a on a given rotor boom 104 to generate a desired lift thrust for each of the electric motors 108a. For example, when rotors with rotor blades (e.g., propellers) are used, the flight controller 120 may vary the revolutions per minute (RPM) of the rotor and/or, where desired, vary the pitch of the rotor blade. Specifically, the electric motors 108a may be controlled by adjusting power supplied to each electric motor from a power supply (e.g., a battery pack or a battery bank) via the ESC 106.

The processor 116 may be operatively coupled to the navigation system 124, which may include a global positioning system (GPS) 124a that is communicatively coupled with an Inertial Navigation System ("INS") 124b and/or an inertial measurement unit (IMU) 124c. The GPS 124a gives an absolute drift-free position value that can be used to reset the INS solution or can be blended with it by use of a mathematical algorithm, such as a Kalman Filter.

The processor 116 may be operatively coupled with one or more 3D scanners 112 and/or one or more cameras 114. While the aircraft 100 scans a featureless surface (e.g., to detect defects in the surface), the one or more processors 116 may be configured to generate a complete 3D model of the featureless surface by registering two or more point clouds received from the one or more 3D scanners 112. The one or more processors 116 may further be configured to localize the aircraft to which the 3D scanner is mounted based at least in part on data received from the one or more 3D scanners 112 and/or one or more cameras 114. Along a similar vein, to collect data and/or monitor an area, the aircraft 100 may further be equipped with an intelligence, surveillance, and reconnaissance (ISR) payload 126 comprising, for example, one or more cameras, audio devices, and other sensors to facilitated ISR functionality and provide ISR data (e.g. photographs, video, audio, sensor measurements, etc.). The ISR payload 126 is operatively coupled to the processor 116 to facilitate communication of the ISR data between the ISR payload 126 and the processor 116. The ISR payload 126 may be rotatably and pivotally coupled to the underside of the airframe 102 (or another structural component, such as the rotor booms 104), for example, via a gimbal device, to enable the ISR payload 126 to be more easily oriented downward to monitor objects below and/or on the ground.

The complete 3D model, ISR data, and/or other information may be dynamically or periodically communicated from the aircraft 100 to the remote device 130 over the network 128 via the wireless transceiver 122. The complete 3D model, ISR data, and/or other information may also be stored to the memory device 118 for later access or processing. In certain aspects, unprocessed data from the various onboard sensors (e.g., 3D scanner 112, camera 114, ISR payload 126, etc.) may be communicated from the aircraft 100 via the wireless transceiver 122 as raw data for remote processing. For example, the aircraft 100 may dynamically communicate the two or more point clouds captured by the one or more 3D scanners 112, along with any fiducial marker data (e.g., data relating to the laser speckle pattern), to the remote device 130 via the wireless transceiver 122, whereby the remote device 130 may be configured to generate the complete 3D model of the featureless surface by registering the two or more point clouds. An advantage of remote data processing is that processing resources needed onboard the aircraft 100 may be reduced, thereby reducing weight and cost of the aircraft 100.

Figure 2:
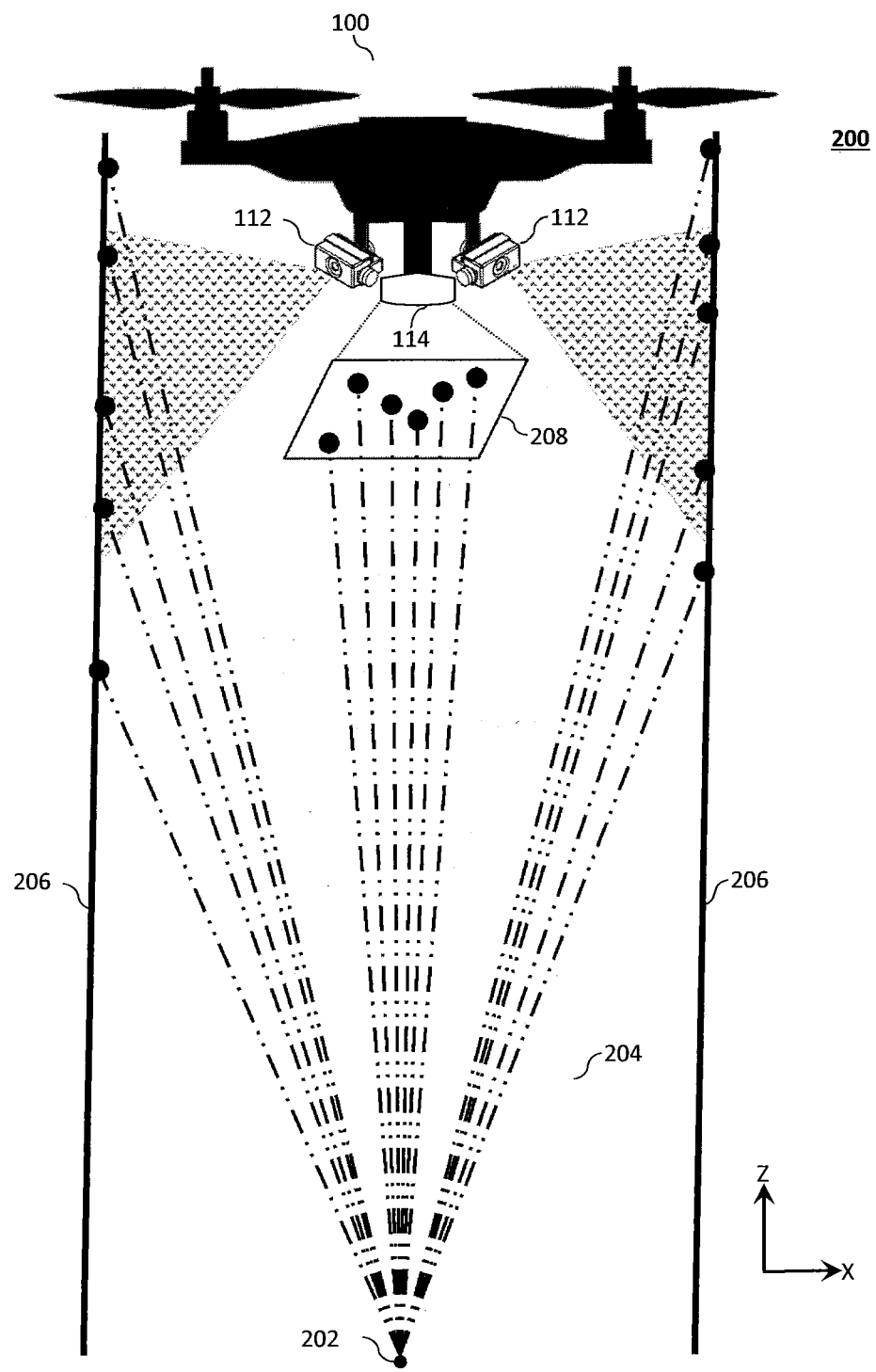
FIG. 2 illustrates an example laser speckle system.

Laser Speckle System 200. With reference to FIG. 2, an example laser speckle system 200 is illustrated having a speckle generator 202 to project upward a laser speckle to display one or more pseudo-random laser speckle patterns onto a featureless surface 206 and/or a diffuser 208 mounted to and below the aircraft 100. The featureless surface 206 may be, for example, a wall of a building, a surface of a bridge, or another structure for inspection by the aircraft 100. The speckle generator 202 may be positioned at a known location at the bottom of the air space 204 and configured to project the laser speckle as an array of laser beams upwardly (e.g., vertically or angled) toward the aircraft 100, which may then be used by the 3D scanner 112 and/or camera 114 to, inter alia, configure the boundaries that define the aircraft's 100 flight path.

Point Cloud Registration. In 3D imaging, a point cloud is a collection of data points in a three-dimensional coordinate system (defined by X-, Y-, and Z-coordinates) that represent the external surface of an object, such as the featureless surface 206. The point clouds may be created by the 3D scanners 112 as the aircraft 100 traverses the featureless surface 206. In operation, the 3D scanners 112 may measure roughly 10 million points per second at a range of a few meters on the featureless surface 206, which may then be output as a point cloud of 10 million points per second in a point cloud data file. The point cloud data file can be used for many purposes, including creating 3D computer-aided design (CAD) models, metrology inspection, quality inspection, and the like. While point clouds can be directly rendered and inspected, it is often useful to convert the point clouds into one or more 3D models, such as to polygon mesh or triangle mesh models, non uniform rational basis spline (NURBS) surface models, or CAD models through a process commonly referred to as surface reconstruction.

When multiple 3D scanners 112 are used to observe the featureless surface 206, or a single 3D scanner 112 observes the featureless surface 206 from multiple views (e.g., as the aircraft 100 traverse the featureless surface 206), the various point clouds from each 3D scanner 112 must be aligned to generate a complete 3D model. The process of aligning the various point clouds into a complete 3D model is known as registration. An objective of the registration process is to determine the relative positions and orientations of the separately acquired views in a global coordinate framework such that the intersecting areas between the views (or point clouds) them may be aligned.

For every set of point cloud data files acquired from a different view/region, the point cloud datasets may be aligned into a single point cloud model using, for example, fiducial markers. Generating a single point cloud model facilitates subsequent processing steps (e.g., segmentation, object reconstruction, etc.). While physical features and physical edges of the surface may be used as fiducial markers to register multiple point clouds, registering two point clouds while the 3D scanner 112 scans a featureless surface 206 can be challenging because the featureless surface 206 generally lacks such landmarks that may be used as fiducial markers for reference point tracking. Existing methods simply bypass this challenge by supplementing the featureless surface 206 with physical fiducial markers (e.g., tags, reflective markers, etc.) to be used as reference points. As can be appreciated, adding physical fiducial markers to a surface 206, however, increases labor and cost to the inspection.

To obviate the need for physical fiducial markers, a speckle generator 202 may be used to generate a pseudo-random laser speckle pattern 308 on the featureless surface 206 from a known, stable central location. The pseudo-random laser speckle pattern 308 functions as the fiducial markers to enable the 3D scanner 112 to register the multiple point clouds from the 3D scanner(s) 112. The one or more 3D scanners 112, together with a speckle generator 202, may be used by an image processor (e.g., the processor 116 or a remote processor) to register point clouds of a wall measured from the aircraft 100. In other words, the laser speckle system 200 generates fiducial markers on the featureless surface 206 in the form of a laser speckle, without requiring placement of any physical artifacts.

The calibrated speckle generator 202 may also generate a pseudo-random laser speckle pattern 308 on a diffuser 208 coupled to and below the aircraft 100. The one or more cameras 114, together with a speckle generator 202 and a diffuser 208, may be used to localize the aircraft 100 along the X-, Y-, and Z-axes. For example, using the laser speckle pattern projected on the diffuser 208, the aircraft 100 is also able to detect any horizontal offset of the aircraft 100 relative to the speckle generator via the camera 114. To prevent the lasers from simply passing through the diffuser 208, the diffuser 208 may be fabricated using, for example, an opaque material to absorb light from the speckle generator 202 such that a pseudo-random laser speckle pattern 308 is displayed on the surface of the diffuser 208 facing the camera 114. For example, a downward-facing camera 114 communicatively coupled with the processor 116 may be configured to image a first surface of the diffuser 208, while the speckle generator 202 may be configured to project a laser speckle pattern onto a second surface of the diffuser. The downward-facing camera 114 is configured to image the first surface to capture the second laser speckle pattern because the diffuser 208 absorbs and diffuses the pseudo-random laser speckle pattern 308. The diffuser 208 may be fabricated from one of a plurality of materials, including glass, plastic, or the like, which may be entirely opaque or coated on at least one surface with an opaque film. For example, the diffuser 208 may be a ground glass diffuser, Teflon® diffuser, holographic diffuser, opal glass diffuser, greyed glass diffusers, etc.

A portion of the pseudo-random laser speckle pattern projected onto the featureless surface 206 may be imaged by 3D scanner(s) 112 mounted to the aircraft 100. In operation, the aircraft 100 may be flown within an air space 204 adjacent the featureless surface 206 and configured to map the featureless surfaces 206 for defects using one or more 3D scanners 112. Based at least in part on the laser speckle's pattern, the laser speckle system 200 is able to register multiple point clouds generated by the 3D scanner 112. For example, the D component of the 3D scanner 112 may be used to create 3D point clouds of the surface of the featureless surfaces 206, while the RGB component may be used to detect the laser speckle pattern on the featureless surfaces 206 using the 3D scanner's 112 RGB component, which can then be used to register 3D point clouds from the 3D scanner 112. The location of the aircraft 100 relative to the known location of calibrated speckle generator 202 may be determined using the pseudo-random laser speckle pattern projected onto the featureless surface 206 and/or the diffuser 208. For example, by identifying the laser speckle pattern with a camera (whether the camera 114 or the RGB component of the 3D scanner 112), the aircraft's 100 horizontal offset can also be detected and corrected.

Figure 3:
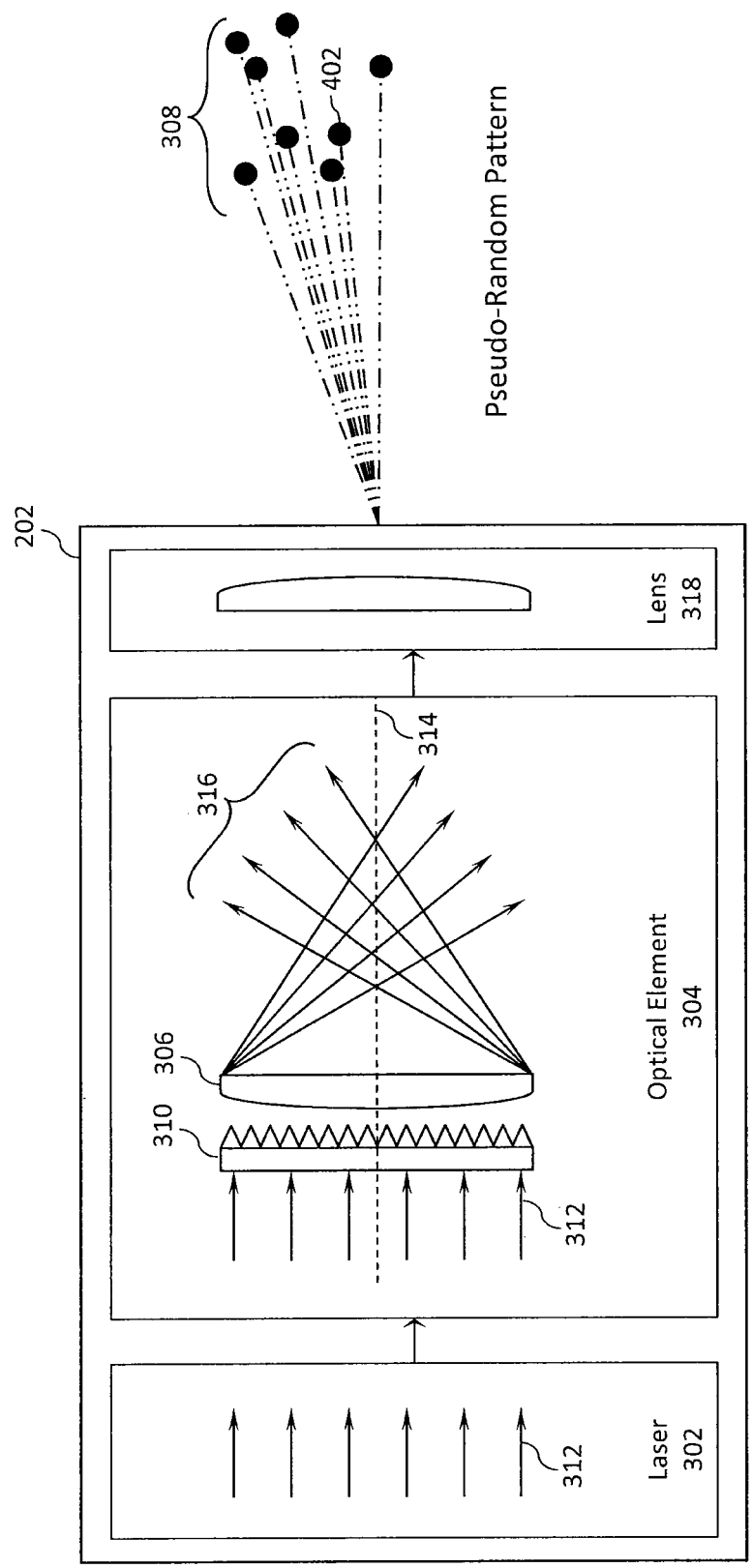
FIG. 3 illustrates an example speckle generator.

Speckle Generator 202. FIG. 3 illustrates an example speckle generator 202. As illustrated, the speckle generator 202 generally comprises a laser source 302, an optical element 304, and one or more additional focusing lens 318 to generate a pseudo-random laser speckle pattern 308. The laser source 302 may use one of a plurality of lasing mediums, including, for example, solid-state, gas, excimer, dye, or semiconductor. Solid-state lasers, for example, have a lasing material distributed in a solid matrix (e.g., the ruby or neodymium-YAG (yttrium aluminum garnet) lasers). The neodymium-YAG laser emits infrared light at 1.064 micrometers. Semiconductor lasers, sometimes called diode lasers, are not solid-state lasers, but are generally small, use low power, and may be built into larger arrays.

The optical element 304 may include a diffractive element 310 and one or more lens 306 to direct and focus the laser beams projected by the speckle generator 202. The diffractive element 310 may be, for example, a diffraction grating, multifocal diffractive lens, prism, dispersive element, or other optical element to divide, or split, an incident beam 312 from the laser source 302 into laser beams of multiple orders 316. A diffraction grating, for example, employs a large number of parallel, closely spaced slits (typically, 80-3000 lines per millimeter measured in lines per mm). When an incident beam 312 of a single wavelength (e.g., a 632.8 nm red light from a helium-neon laser) strikes the diffraction grating, the incident beam 312 is diffracted to each side of the propagation axis 314 in beams of multiple orders 316. Different wavelengths, however, are diffracted at different angles, according to the grating relationship. In another example, the diffractive element 310 may be a multifocal diffractive lens that allows the incident beam 312 from the laser source 302 to be focused simultaneously at several positions along the propagation axis 314. More specifically, in a multifocal diffractive lens, the incident beam 312 is deflected by grooved diffraction patterns into multiple orders 316 along the propagation axis 314. One or more additional focusing lens 318 may further be employed to focus and/or adjust the beams of multiple orders 316.

The speckle generator 202 may be placed at the location of interest (e.g., a landing zone, an inspection point, etc.), whereby the pseudo-random laser speckle pattern 308 of dots 402 is projected towards an expected location of the aircraft 100 or toward another target. For example, the speckle generator 202 may be positioned at an inspection point (e.g., a structure) to assist the aircraft in scanning, mapping, and/or monitoring the integrity of the structure. In this example, the speckle generator 202 may project the pseudo-random laser speckle pattern 308 upward and onto the structure to be scanned, mapped, and/or monitored.

In certain aspects, the speckle generator 202 may be positioned at a landing zone to facilitate delivery of cargo (e.g., a package) to a manned or unmanned landing zone, whether civilian or military. In one example, the speckle generator 202 may generate the pseudo-random laser speckle pattern 308 on the diffuser 208 coupled to and below the aircraft 100. The one or more cameras 114, together with a speckle generator 202 and a diffuser 208, may be used to localize the aircraft 100 along the X-, Y-, and Z-axes vis-á-vis the speckle generator 202. In another example, the aircraft 100 may approach an area, scan the landing zone around the speckle generator 202 at the area, identify a touchdown zone within the landing zone (e.g., during approach) based at least in part on the pseudo-random laser speckle pattern 308 generated by the speckle generator 202, and autonomously land at the touchdown zone while tracking (or based at least in part on) the pseudo-random laser speckle pattern 308. When a diffuser 208 is unavailable/undesired and/or the speckle generator 202 is employed adjacent a ground/landing surface (e.g., pad, airport, field, yard, rooftop, etc.), the speckle generator 202 may be positioned off the ground/landing surface (e.g., using a post, tripod, tower, or other elevated structure) and configured to project the pseudo random laser speckle pattern 308 downward toward the ground/landing surface, which may then be scanned/tracked by the aircraft's 100 optical capture device(s) to identify the touchdown zone. In certain aspects, the speckle generator 202 may be used in conjunction with the autonomous cargo delivery system disclosed by commonly owned U.S. Pat. No. 9,557,742 to Paduano et al., which issued on Jan. 31, 2017.

The term speckle pattern refers to a granular pattern which can be observed when a highly coherent light beam (e.g. from a laser) is diffusely reflected at a surface with a complicated structure. As the pattern used to generate the laser speckle is pre-defined, the speckle pattern 308 is fixed and known ahead of time; due to the manufacturing uncertainty constraints, the speckle pattern may be different sample-to-sample and the pattern remains a pseudo-random pattern. The size and shape of the pseudo-random laser speckle pattern 308 remains linearly invariant, scaling to the distance from the laser source. The speckle generator 202 creates a pseudo-random laser speckle pattern 308 that can be uniquely identified based on the distance relationship of a random selection of a plurality of neighbor dots 402.

FIGS. 4a to 4c illustrate an example laser speckle processing technique using a wide field of view from the 3D scanner 112. The laser speckle processing technique may be used in connection with registration of point clouds and/or aircraft localization. Specifically, FIG. 4a illustrates an example pseudo-random laser speckle pattern 308 from the speckle generator 202 as captured by the 3D scanner 112 (or camera 114). The processor 116 may employ a plurality of image processing techniques to enhance detection of the dots 402 of the pseudo-random laser speckle pattern 308. To that end, the processor 116 may employ image segmentation to partition a digital image of the pseudo-random laser speckle pattern 308 into multiple segments (e.g., sets). For example, the processor 116 may employ one or more image thresholding techniques to generate a binary image (or other high contrast image) where the dots are one color (e.g., black) and the remainder of the featureless surface 206 (or diffuser 208) is a second, contrasting, color (e.g., white).

From the dots 402 within the pseudo-random laser speckle pattern 308, a plurality of random nearest neighbor dots 402 (e.g., about 4 to 20, more preferably about 6 to 14, most preferably about 8 to 10) are chosen to create a speckle pattern 400, an example of which is illustrated in FIG. 4b. The distances between the dots 402 of the speckle pattern 400 are normalized and the radius of each of the dots 402 can be measured. For example, the processor may be configured to determine a dot size of the second laser speckle pattern by measuring a diameter of at least one of said plurality of dots 402 and/or determine a dot distance by measuring a distance between at least two of said plurality of dots 402 (e.g., two adjacent dots 402).

The speckle pattern 400 may then be compared to a database of known speckle patterns 404a, 404b, 404n using, for example, a lookup table until a best match is identified. The database of known speckle patterns 404a, 404b, 404n may be stored to memory device 118 of the aircraft 100, or another memory device (e.g., at the remote device 130). This process of extracting a speckle pattern 400 and comparing the speckle pattern 400 to known speckle patterns 404 may be repeated using different sets of random dots 402 to generate consensus, a process that can be referred to as random sample consensus (RANSAC).

Figure 5B:
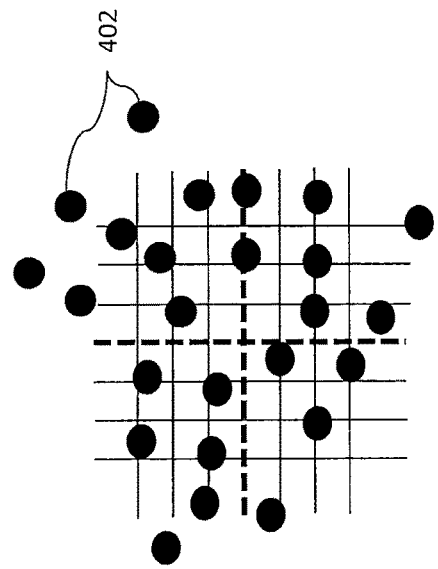
FIGS. 5a to 5d illustrate an example laser speckle processing technique for localization of an aircraft's lateral position.
Figure 5D:
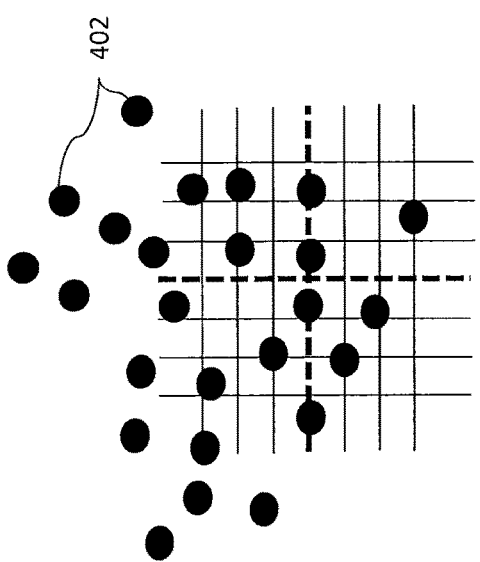
Figure 5A:
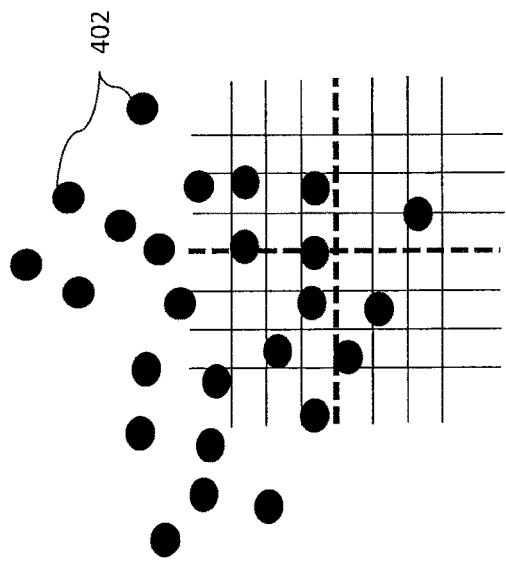
Figure 5C:
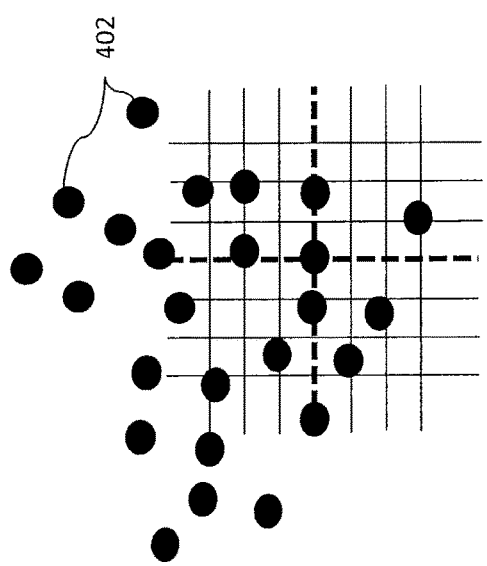

FIGS. 5a to 5d illustrate an example laser speckle processing technique for localization of aircraft's 100 lateral position in a plane parallel to the ground based on a wide field of view from the 3D scanner 112. Specifically, FIG. 5a illustrates a pseudo-random laser speckle pattern 308 at ground truth (0, 0), while FIGS. 5b through 5d illustrate, respectively, the pseudo random laser speckle pattern 308 at ground truth (0, –0.4), ground truth (0.5, 0), and ground truth (1.9, 2). Once the plurality of random nearest neighbor dots 402 is identified to define the speckle pattern 400, the lateral center of the speckle pattern 400 can be employed to localize the aircraft 100 to the laser speckle sky. More specifically, because the location of the speckle generator 202 is known, the location of the pseudo-random laser speckle pattern 308 within the two-dimensional (e.g., X-Y) coordinate plane is known.

By way of illustration, assume that pseudo-random laser speckle pattern 308 at ground truth (0, 0) represents the desired location. Using this knowledge, the aircraft 100 can adjust the lateral position of the aircraft 100 when the ground truth deviates from (0, 0). For example, FIG. 5b illustrates where the lateral position of the aircraft 100 is laterally displaced by 0.4 along the Y-axis and, therefore, and adjustment of –0.4 in the Y-axis (i.e., 0, –0.4) is necessary. Similarly, FIG. 5c illustrates where the lateral position of the aircraft 100 is laterally displaced by 0.5 along the X-axis, while FIG. 5d illustrates where the lateral position of the aircraft 100 is laterally displaced by 1.9 along the X-axis and by 2.0 along the Y-axis, thereby warranting lateral adjustments of, (0.5, 0) and (1.9, 2) respectively.

FIGS. 6a to 6c illustrate an example localization process of aircraft's 100 vertical position relative to the speckle generator 202 based on images from the camera 114. That is, distances between the dots 402 and dot radius will provide the z-distance from the speckle generator 202. For example, as the aircraft's 100 distance from speckle generator 202 changes, a linear change in the distance between the dots 402 is expected and may be observed. Likewise, the radius of each dot 402 will change linearly with respect to distance between the aircraft 100 and the speckle generator 202. By way of illustration, FIG. 6a illustrates the pseudo-random laser speckle pattern 308 at distance A, while FIGS. 6b and 6c illustrate the pseudo-random laser speckle pattern at distance 2 A (double the distance) and 0.5 A (half the distance), respectively. The diameter and space between the dots 402 at distance A is double that of distance 2 A, while being half that of distance 0.5 A.

Due to beam divergence, the size of the dots 402 increases with distance. Indeed, beam divergence of a laser beam is an angular measure of the increase in beam diameter (or radius) with distance from the optical aperture (e.g., speckle generator 202) from which the beam emerges. Limitations, however, can occur at distances when the pseudo-random laser speckle pattern 308 becomes too large (e.g., FIG. 6b) or when the pseudo-random laser speckle pattern 308 is too small (e.g., FIG. 6c). For the FIG. 6b scenario, however, the pseudo-random laser speckle pattern 308 can be tracked from a closer distance to mitigate the issue, while, for the FIG. 6c scenario, the speckle is not well defined on the sensor and only a single dot (averaging all the laser intensities) may be imaged to locate as the "center". However, these concerns may be mitigated by adjusting the lens 318 on the laser speckle generator to adjust and focus or de-focus the laser speckle pattern 308 as necessary.

Figure 7A:
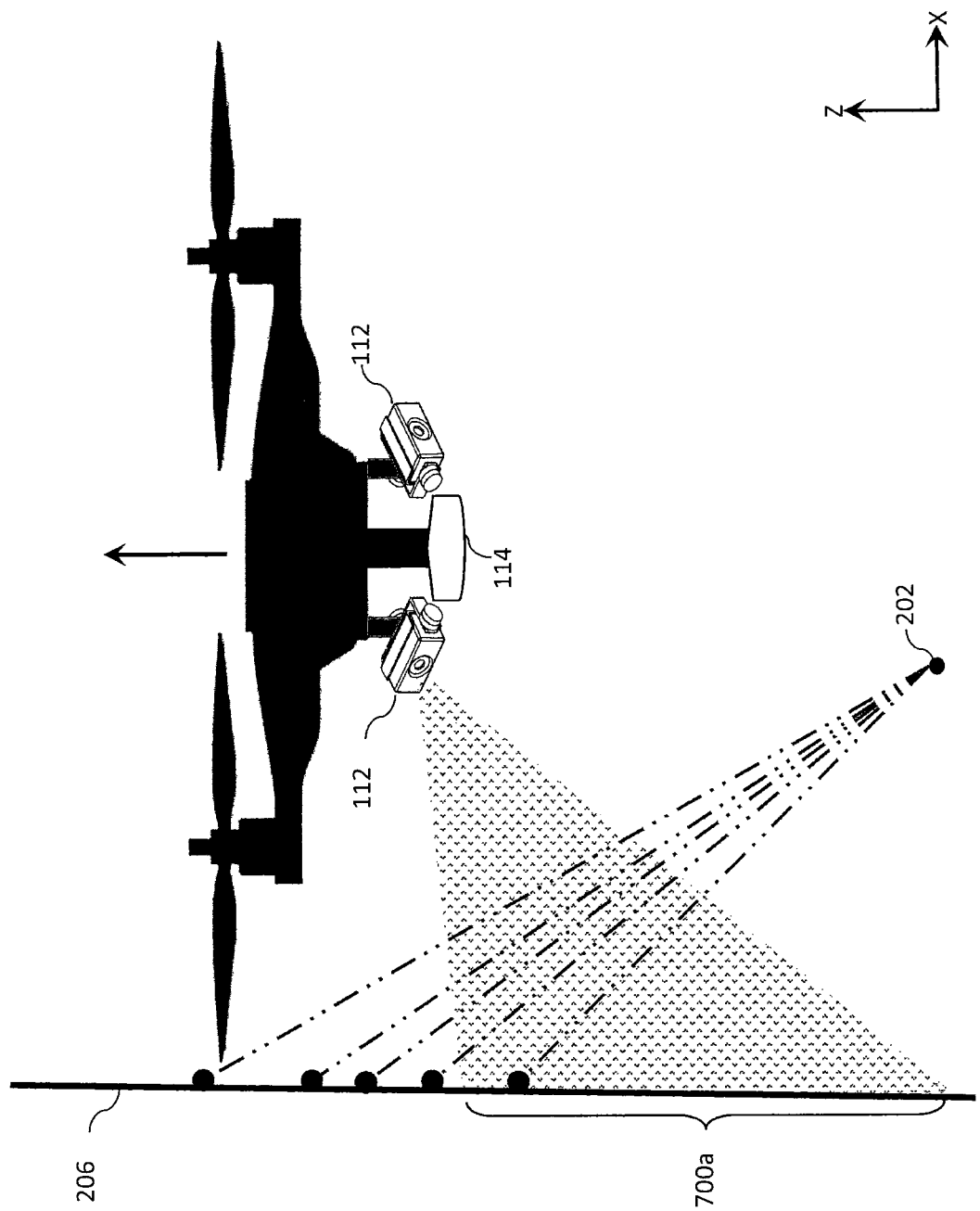
FIGS. 7a to 7c illustrate a diagram of an aircraft scanning different regions of a surface.
Figure 7B:
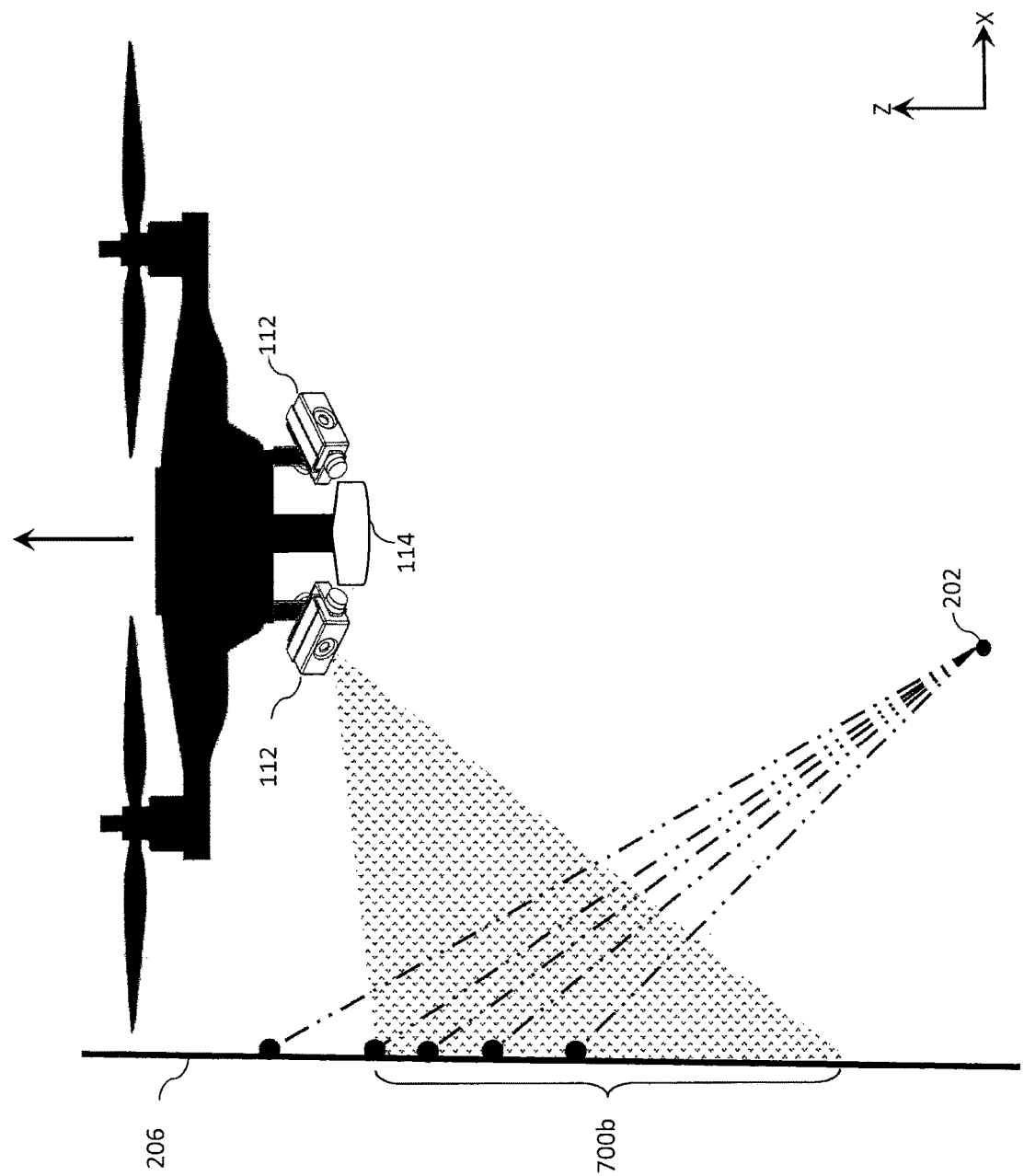
Figure 7C:
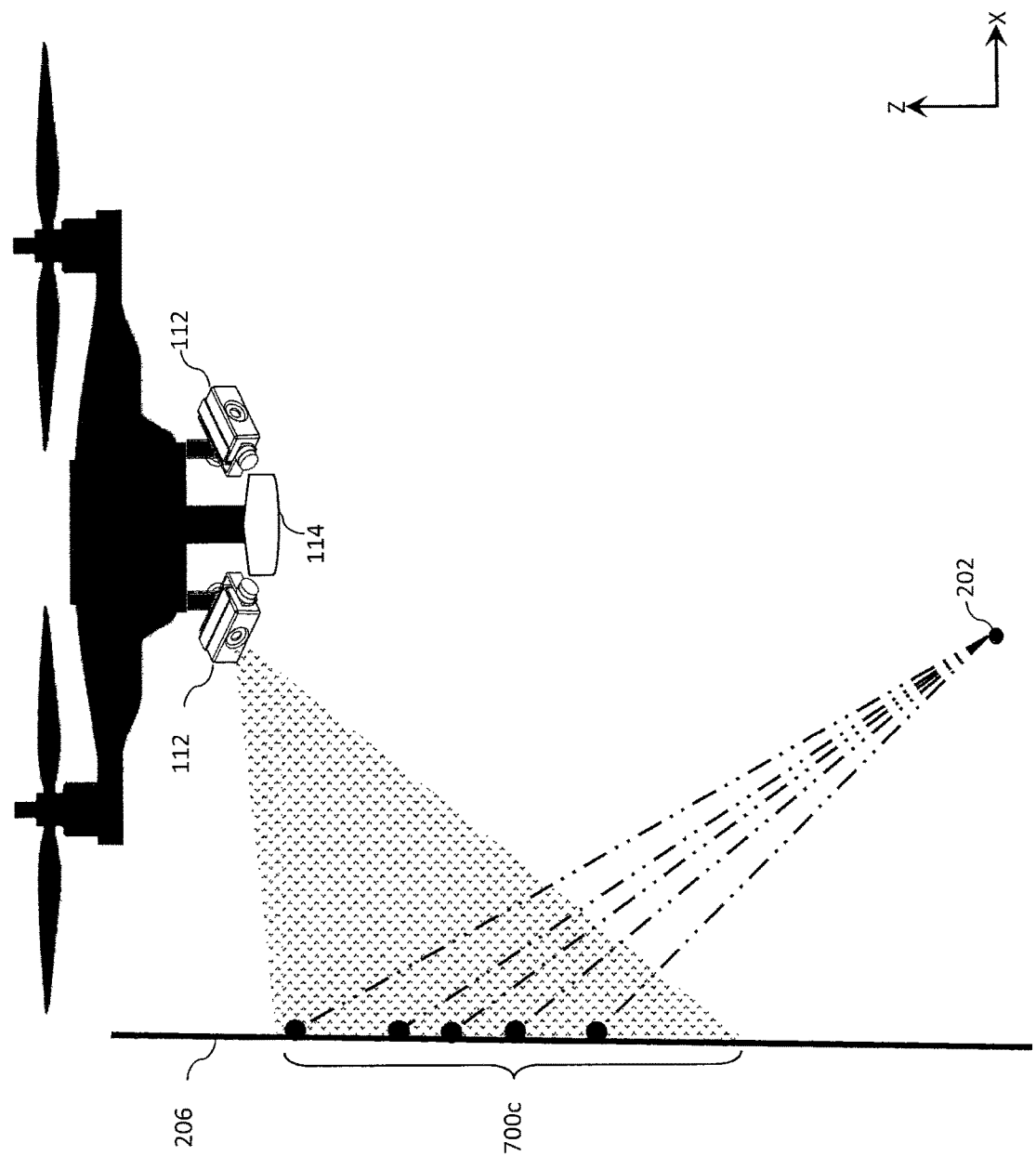

FIGS. 7a through 7c illustrate an example technique for registering point clouds. As illustrated, the speckle generator 202 projects a pseudo-random laser speckle pattern 308 onto a featureless surface 206 while the aircraft 100 travel along the Z-axis (i.e., up and down) to scan the vertical length of the featureless surface 206.

As illustrated in FIG. 7a, the aircraft 100 scans a first region 700a of the featureless surface 206 to generate a first local point cloud via a 3D scanner 112. Once complete with the first region 700a, as illustrated in FIG. 7b, the aircraft 100 progresses along the featureless surface 206 in the Z-axis to scan a second region 700b of the featureless surface 206 to generate a second local point cloud via a 3D scanner 112. Once complete with the second region 700b, as illustrated in FIG. 7c, the aircraft 100 progresses along the featureless surface 206 in the Z-axis to scan a third region 700c of the featureless surface 206 to generate a third local point cloud via a 3D scanner 112. The aircraft 100 may repeat the process for each region until the entire featureless surface 206 is scanned.

To ensure that all portions of the featureless surface 206 are scanned, the various consecutively scanned regions may overlap at least in part. For example, first region 700a may overlap at least in part with the second region 700b, while the second region 700b may over overlap at least in part with the third region 700c. Using the pseudo-random laser speckle pattern 308, which overlaps at least in part with each of the first, second, and third regions 700a, 700b, 700c, aircraft 100 may register the first, second, and third point clouds from the 3D scanner(s) 112 to form a complete 3D model. Indeed, the aircraft 100, via the one or more 3D scanners 112, may capture multiple views of the same region (e.g., first region 700a) at different angles, where each view has a point cloud. While FIGS. 7a through 7c are described using a single 3D scanner 112, multiple 3D scanners 112 may be used throughout the scanning process to scan the same region (e.g., from a slightly different angle) or a second featureless surface that may be adjacent the featureless surface 206. For example, when a single 3D scanner 112 is used to scan the first region 700a, the 3D scanner 112 may pivot, or otherwise adjust, using the gimbal to capture a second view of the first region 700a. When multiple 3D scanners 112 are used, each 3D scanner 112 may simultaneously capture views of the first region 700a from different angles.

The aircraft 100 may follow one or more scanning flight patterns during a scanning process. FIGS. 8a through 8d illustrate an example featureless surface 206 divided into 16 regions 700. To scan each of the 16 regions 700, the aircraft 100 may employ one or more scan paths. For example, the aircraft 100 may scan the featureless surface 206 as a series of vertical regions (e.g., as dictated by the vertical scan path 800a of FIG. 8a), a series of horizontal regions (e.g., as dictated by the horizontal scan path 800b of FIG. 8b), a series of spiral regions (e.g., as dictated by the spiral scan path 800c of FIG. 8c), or a combination thereof as dictated by the hybrid scan path 800d of FIG. 8d.

During the scanning process, the 3D scanner 112 may employ one or more light sources and one or more imagers with two distinct modes. In operation, the 3D scanner 112 projecting a structured light from a 3D scanner 112 to visualize a region of the featureless surface 206 on the imager to generate a local point cloud for a given region. The 3D scanner 112 may then turn off the structured light from 3D scanner 112 to visualize the pseudo-random laser speckle pattern 308 to determine a fiducial relationship between time-adjacent (or space-adjacent) captured point clouds. For example, the 3D scanner 112 may scan a first region to generate a first point cloud, and then proceed to scan a second region to generate a second point cloud. Based on the fiducial relationship, the aircraft 100 may perform a rough registration of captured point clouds (e.g., the first point cloud to the second point cloud). The aircraft 100 may perform a fine registration of captured point clouds using one or more algorithm to minimize the difference between the two clouds points. For example, the aircraft 100 may perform an Iterative Closest Point (ICP) algorithm to reconstruct 2D or 3D surfaces from multiple different clouds points, to localize the aircraft 100, and to achieve optimal scan path planning of the aircraft 100.

FIG. 9 illustrates an example scanning process 900. The scanning process 900 starts at step 902 (e.g., upon initiation of scanning software). At step 904, the 3D scanner 112 projects a structured light from the 3D scanner 112 to visualize a first region 700a of the featureless surface 206 on the imager.

At step 906, the processor 116 generates a first local point cloud associated with the first region 700a. At step 908, the 3D scanner 112 shuts off the structured light from the 3D scanner 112. At step 910, the processor 116 visualizes the pseudo-random laser speckle pattern 308. At step 912, the processor 116 determines a fiducial relationship between time-adjacent (or space-adjacent) captured point clouds. If a time-adjacent (or space-adjacent) point cloud has not previously been captured, steps 912 through 916 are bypassed and the scanning process 900 proceeds to step 918.

At step 914, the processor 116 performs a rough registration of captured point clouds based at least in part on the fiducial relationship determined at step 912. At step 916, the processor 116 performs a fine registration of captured point clouds using one or more algorithms (e.g., the ICP algorithm) to minimize the difference between two clouds points.

At step 918, the processor 116 determines whether the scanning process 900 should be terminated. The scanning process 900 may be terminated when the scanning process is complete (i.e., all regions have been cancelled), an error is detected, operator comment (e.g., an abort instruction), etc.

If the scanning process 900 is to be terminated, the scanning process 900 proceeds to step 922, where the scanning process 900 is terminated until reset or restarted; otherwise the scanning process 900 continues to step 920 to scan the a subsequent region (e.g., a subsequent time-adjacent or space-adjacent region). At step 920, the aircraft 100 navigates to the next region to be scanned. For example, the processor 116 may command the flight controller 120 to navigate the aircraft 100 from its current location to a subsequent location to scan the subsequent region.

The above-cited patents and patent publications are hereby incorporated by reference in their entirety. Where a definition or the usage of a term in a reference that is incorporated by reference herein is inconsistent or contrary to the definition or understanding of that term as provided herein, the meaning of the term provided herein governs and the definition of that term in the reference does not necessarily apply. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the teachings of the subject disclosure may therefore be practiced otherwise than as specifically described above.

What is claimed is:

1. A method for registering multiple point clouds via an aircraft, the method comprising:
    projecting, via a speckle generator, a laser speckle pattern onto a featureless surface and an opaque diffuser coupled to the aircraft from a physical location other than the aircraft for inspection by the aircraft;
    scanning, via at least one three-dimensional (3D) scanner coupled to the aircraft, the featureless surface;
    generating, via the at least one 3D scanner, a plurality of point clouds of the featureless surface;
    imaging, via the at least one 3D scanner, at least a portion of the laser speckle pattern on the featureless surface and on the opaque diffuser;
    performing, via a processor communicatively coupled with the at least one 3D scanner, a rough registration of the plurality of point clouds;
    generating, via the processor, a 3D model of the featureless surface based at least in part on the laser speckle pattern; and
    localizing the aircraft relative to the speckle generator based at least in part on the laser speckle pattern projected onto the opaque diffuser coupled to the aircraft.

2. The method of claim 1, further comprising the step of performing, via the processor, a fine registration of the plurality of point clouds using one or more algorithms.

3. The method of claim 1, further comprising the step of identifying, via the processor, a speckle pattern by selecting from the laser speckle pattern a plurality of random nearest neighbor dots.

4. The method of claim 3, further comprising the step of comparing, via the processor, the speckle pattern to a plurality of known speckle patterns to identify, from the plurality of known speckle patterns, a best match speckle pattern.

5. The method of claim 1, wherein the physical location of the speckle generator is a known, ground-based location, the method further comprising the step of localizing, via the processor, the aircraft relative to a touchdown zone based at least in part on the laser speckle pattern projected onto the opaque diffuser.

6. The method of claim 5, further comprising the step of generating, via the processor, instructions to land the aircraft at the touchdown zone based at least in part on the laser speckle pattern projected onto the opaque diffuser.

7. A system for registering multiple point clouds via an aircraft, the system comprising:
    a speckle generator configured to project a laser speckle pattern onto a featureless surface and an opaque diffuser coupled to the aircraft from a physical location other than the aircraft for inspection by the aircraft;
    at least one three-dimensional (3D) scanner coupled to the aircraft and configured to scan the featureless surface and the opaque diffuser, wherein the at least one 3D scanner is configured to generate a plurality of point clouds of the featureless surface and to image at least a portion of the laser speckle pattern; and a processor communicatively coupled with the at least one 3D scanner, wherein the processor is configured to: (1) perform a rough registration of the plurality of point clouds to generate a 3D model of the featureless surface based at least in part on the laser speckle pattern, and (2) localize the aircraft relative to the speckle generator based at least in part on the laser speckle pattern projected onto the opaque diffuser.

8. The system of claim 7, wherein the speckle generator includes a laser source to generate a laser beam and an optical element to diffract the laser beam into a plurality of laser beams of multiple orders, wherein the plurality of laser beams defines the laser speckle pattern.

9. The system of claim 7, wherein the processor is configured to identify a speckle pattern by selecting from the laser speckle pattern a plurality of random nearest neighbor dots.

10. The system of claim 9, wherein the processor is configured to compare the speckle pattern to a plurality of known speckle patterns to identify, from the plurality of known speckle patterns, a best match speckle pattern.

11. The system of claim 10, wherein the physical location of the speckle generator is a known, ground-based location, and the processor is configured to localize the aircraft relative to the speckle generator based at least in part on the best match speckle pattern.

12. The system of claim 7, wherein the processor is configured to perform a fine registration of the plurality of point clouds using one or more algorithms.

13. The system of claim 7, wherein the laser speckle pattern projected onto the featureless surface is a first laser speckle pattern and the laser speckle pattern projected onto the opaque diffuser is a second laser speckle pattern.

14. The system of claim 13, further comprising a downward-facing camera coupled to the aircraft and communicatively coupled with the processor, the downward-facing camera being configured to image the second laser speckle pattern via the opaque diffuser.

15. The system of claim 14, wherein the processor is configured to localize the aircraft relative to a touchdown zone based at least in part on the second laser speckle pattern.

16. The system of claim 15, wherein the processor is configured to generate instructions to land the aircraft at the touchdown zone based at least in part on the first laser speckle pattern or the second laser speckle pattern.

17. The system of claim 13, wherein the second laser speckle pattern comprises a plurality of dots and the processor is configured to: (1) determine a dot size of the second laser speckle pattern by measuring a diameter of at least one of said plurality of dots; or (2) determine a dot distance by measuring a distance between at least two of said plurality of dots.

18. A system for registering multiple point clouds via an aircraft, the system comprising:
a speckle generator configured to project a laser speckle pattern onto a featureless surface and on an opaque diffuser coupled to the aircraft from a physical location other than the aircraft for inspection by the aircraft;
at least one three-dimensional (3D) scanner coupled to the aircraft and configured to scan the featureless surface and the opaque diffuser, wherein the at least one 3D scanner is configured to generate a plurality of point clouds of the featureless surface and to image at least a portion of the laser speckle pattern; and
a processor communicatively coupled with the at least one 3D scanner,
wherein the processor is configured to perform a rough registration of the plurality of point clouds to generate a 3D model of the featureless surface based at least in part on the laser speckle pattern, and
wherein the processor is further configured to localize the aircraft relative to the speckle generator based at least in part on the laser speckle pattern projected onto the opaque diffuser.

19. The system of claim 18, further comprising a downward-facing camera coupled to the aircraft, wherein the laser speckle pattern projected on the featureless surface is a first laser speckle pattern and the laser speckle pattern projected on the opaque diffuser is a second laser speckle pattern, and wherein the downward-facing camera is arranged to image the second laser speckle pattern.

20. The system of claim 19, wherein the second laser speckle pattern comprises a plurality of dots and the processor is configured to determine a vertical position of the aircraft relative to the speckle generator based at least in part on a dot size or a dot distance, wherein the processor is configured to: (1) determine the dot size of the second laser speckle pattern by measuring a diameter of at least one of said plurality of dots; or (2) determine the dot distance by measuring a distance between at least two of said plurality of dots.

* * * * *